US012206720B2

(12) United States Patent
Wang et al.

(10) Patent No.: US 12,206,720 B2
(45) Date of Patent: Jan. 21, 2025

(54) REMOTELY DIRECTING VIDEO STREAMS

(71) Applicant: SHANGHAI BILIBILI TECHNOLOGY CO., LTD., Shanghai (CN)

(72) Inventors: Bo Wang, Shanghai (CN); Zhaozhi Xiong, Shanghai (CN); Yao Wang, Shanghai (CN); Xiulin Song, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/771,778

(22) PCT Filed: Aug. 18, 2020

(86) PCT No.: PCT/CN2020/109873
§ 371 (c)(1),
(2) Date: Apr. 25, 2022

(87) PCT Pub. No.: WO2021/082646
PCT Pub. Date: May 6, 2021

(65) Prior Publication Data
US 2022/0377122 A1 Nov. 24, 2022

(30) Foreign Application Priority Data
Oct. 31, 2019 (CN) .......................... 201911056312.3

(51) Int. Cl.
*H04L 65/611* (2022.01)
*H04L 61/00* (2022.01)
(Continued)

(52) U.S. Cl.
CPC ............ *H04L 65/611* (2022.05); *H04L 61/35* (2013.01); *H04L 65/1013* (2013.01); *H04L 65/612* (2022.05); *H04N 5/268* (2013.01)

(58) Field of Classification Search
CPC ..... H04L 61/35; H04L 65/1013; H04L 65/60; H04L 65/611; H04L 65/612; H04L 65/61; H04N 5/268
See application file for complete search history.

(56) References Cited

U.S. PATENT DOCUMENTS

2007/0050828 A1* 3/2007 Renzi ..................... H04N 7/163
348/E7.071
2014/0092254 A1* 4/2014 Mughal ................... H04N 5/28
348/598
(Continued)

FOREIGN PATENT DOCUMENTS

| CN | 105933794 A | 9/2016 |
| CN | 106331748 A | 1/2017 |

(Continued)

OTHER PUBLICATIONS

International Patent Application No. PCT/CN2020/109873; Int'l Search Report; dated Oct. 30, 2020; 2 pages.

*Primary Examiner* — Jeong S Park
(74) *Attorney, Agent, or Firm* — BakerHostetler

(57) ABSTRACT

Embodiments of the present application describe techniques of facilitating directing operations. The techniques comprise obtaining guest information of a target studio, where the guest information includes a room identification number of a guest room, the guest room associated with producing content scenes; generating a directing configuration file based on the guest information of the target studio; and sending the directing configuration file to a director terminal
(Continued)

associated with content directing, so that the director terminal performs a directing operation based on the directing configuration file.

15 Claims, 8 Drawing Sheets

(51) Int. Cl.
  *H04L 65/10* (2022.01)
  *H04L 65/612* (2022.01)
  *H04N 5/268* (2006.01)

(56) References Cited

U.S. PATENT DOCUMENTS

| | | | |
|---|---|---|---|
| 2014/0359155 A1 | 12/2014 | Wan et al. | |
| 2015/0032805 A1* | 1/2015 | Huang | H04L 65/612 709/203 |
| 2015/0244987 A1* | 8/2015 | Delegue | H04M 3/567 348/14.09 |
| 2017/0131855 A1* | 5/2017 | Svendsen | H04N 21/47205 |
| 2017/0315696 A1* | 11/2017 | Jacobson | G06F 3/048 |
| 2018/0205976 A1 | 7/2018 | Xue | |
| 2018/0338119 A1* | 11/2018 | Hoffman | H04L 65/1089 |
| 2019/0166223 A1* | 5/2019 | Zhu | H04L 67/1097 |
| 2020/0014964 A1* | 1/2020 | Drako | H04N 21/4223 |

FOREIGN PATENT DOCUMENTS

| | | |
|---|---|---|
| CN | 106385590 A | 2/2017 |
| CN | 106713304 A | 5/2017 |
| CN | 106954100 A | 7/2017 |
| CN | 106993194 A | 7/2017 |
| CN | 107027045 A | 8/2017 |
| CN | 107071584 A | 8/2017 |
| CN | 108712618 A | 10/2018 |
| CN | 108965918 A | 12/2018 |
| CN | 109391822 A | 2/2019 |
| CN | 109391824 A | 2/2019 |
| CN | 109391851 A | 2/2019 |
| CN | 109963162 A | 7/2019 |
| KR | 2006-0132099 A | 12/2006 |
| KR | 2015-0055970 A | 5/2015 |

* cited by examiner

REMOTELY DIRECTING VIDEO STREAMS

CROSS-REFERENCE TO RELATED APPLICATION

The present application is the U.S. National Stage of International Application No. PCT/CN2020/109873, filed on Aug. 18, 2020, which claims priority to the Chinese Patent Application No. 201911056312.3, filed on Oct. 31, 2019, and entitled "Directing method and system", both of which are incorporated herein by reference in their entireties.

TECHNICAL FIELD

Embodiments of the present application relate to the field of information processing, and in particular to a directing method and system, a computer device, and a computer-readable storage medium.

BACKGROUND

At present, in the market, a photographer and a writer-director need to cooperate with each other on producing live streaming of a video program. The inventor has found that professional directing work requires a set of costly facilities for signal switching, sound adjustment, caption adding, program broadcasting, signal recording, virtual set, streaming media recording and live streaming broadcasting, etc. In addition, two to three or more people are needed for cooperative work, leading to high labor costs and poor flexibility.

It can be easily learned that in current directing, there are drawbacks that are high facility costs, high labor costs, and low efficiency of directing operations.

SUMMARY

An objective of embodiments of the present application is to provide a directing method and apparatus, a computer device, and a computer-readable storage medium, to overcome drawbacks in current directing that are high facility costs, high labor costs, and low efficiency of directing operations.

According to an aspect of the embodiments of the present application, a directing method is provided, where the directing method includes: obtaining guest information of a target studio, where the guest information includes a room identification number of a guest room; generating a directing configuration file based on the guest information of the target studio; and sending the directing configuration file to a director terminal, so that the director terminal performs a directing operation based on the directing configuration file.

Optionally, the method further includes: obtaining a push stream address of the guest room, where the push stream address includes a network address of a CDN node; and sending the push stream address to a guest terminal corresponding to the room identification number of the guest room, so that the guest terminal pushes a video stream into the CDN node.

Optionally, the method further includes: sending, in response to a page access request from the director terminal, a control table page for studio management to the director terminal, so that the director terminal inputs configuration information of the target studio by using the control table page, where the configuration information includes the guest information, where the control table page includes a studio list corresponding to each studio, and the studio list includes studio description information, a downloading widget, and/or an editing widget.

Optionally, if the control table page includes a target studio list of the target studio: a downloading widget in the target studio list is configured to trigger pushing of the directing configuration file of the target studio to the director terminal.

Optionally, if the control table page includes a target studio list of the target studio: an editing widget in the target studio list is configured to trigger pushing of an editing page for editing the target studio to the director terminal, where the editing page for the target studio includes a plurality of room lists corresponding to a plurality of candidate rooms, and each room list includes description information of a corresponding candidate room, a switch widget, and/or a reorder widget; and where the switch widget is configured to control whether to configure the corresponding candidate room as a guest room of the target studio.

Optionally, each room list further includes a push stream address of the corresponding candidate room, and the push stream address is obtained in the following manner: obtaining a service status of each CDN node in a CDN network; and configuring a network address corresponding to a CDN node with the best service status as a push stream address of each candidate room.

Optionally, the editing page for the target studio further includes a room adding widget, where the room adding widget is configured to trigger pushing of an editing page for creating a candidate room to the director terminal.

Optionally, the control table page includes a studio creating widget, where the studio creating widget is configured to trigger pushing of an editing page for creating the target studio to the director terminal.

Optionally, the method further includes: configuring the guest room to be in a studio-connected mode, to keep the guest room not in broadcasting to the viewer terminal.

To achieve the above objective, the embodiments of the present application further provide a directing system, where the system includes: an obtaining means configured to obtain guest information of a target studio, where the guest information is used to indicate a guest room connected to the target studio; a generation means configured to generate a directing configuration file based on the guest information of the target studio; and a sending means configured to send the directing configuration file to a director terminal, so that the director terminal performs a directing operation based on the directing configuration file.

To achieve the above objective, the embodiments of the present application further provide a computer device, including a memory, a processor, and computer-readable instructions stored on the memory and executable on the processor, where when executing the computer-readable instructions, the processor implements the steps of: obtaining guest information of a target studio, where the guest information includes a room identification number of a guest room; generating a directing configuration file based on the guest information of the target studio; and sending the directing configuration file to a director terminal, so that the director terminal performs a directing operation based on the directing configuration file.

To achieve the above objective, the embodiments of the present application further provide a computer-readable storage medium having stored thereon computer-readable instructions, where when the computer-readable instructions are executed by a processor, the following steps are implemented: obtaining guest information of a target studio, where the guest information includes a room identification number of a guest room; generating a directing configuration file based on the guest information of the target studio; and sending the directing configuration file to a director terminal, so that the director terminal performs a directing operation based on the directing configuration file.

To achieve the above objective, the embodiments of the present application further provide a directing method, where the method includes: obtaining a directing configuration file of a target studio, where the directing configuration file is pre-configured; importing the directing configuration file into an OBS client; and performing a directing operation in the target studio based on the OBS client into which the directing configuration file is imported.

Optionally, the obtaining a directing configuration file of a target studio includes: obtaining a control table page for studio management from a server; inputting configuration information of the target studio based on the control table page, where the configuration information includes guest information; sending the configuration information to the server, so that the server generates the directing configuration file based on the configuration information; and obtaining the directing configuration file from the server.

According to the directing method and apparatus, the computer device, and the computer-readable storage medium provided in the embodiments of the present application, the directing configuration file of the target studio is generated by obtaining the guest information, etc., and the directing operation can be performed in the director terminal based on the directing configuration file. An operation procedure thereof is simple and has high directing efficiency, and does not require cooperative work involving a plurality of people, thereby effectively implementing a function of directing transitions and switching with low costs and simply using software. In addition, this method does not depend on such a physical facility, so that facility costs and labor costs are reduced.

DETAILED DESCRIPTION OF EMBODIMENTS

Figure 1:
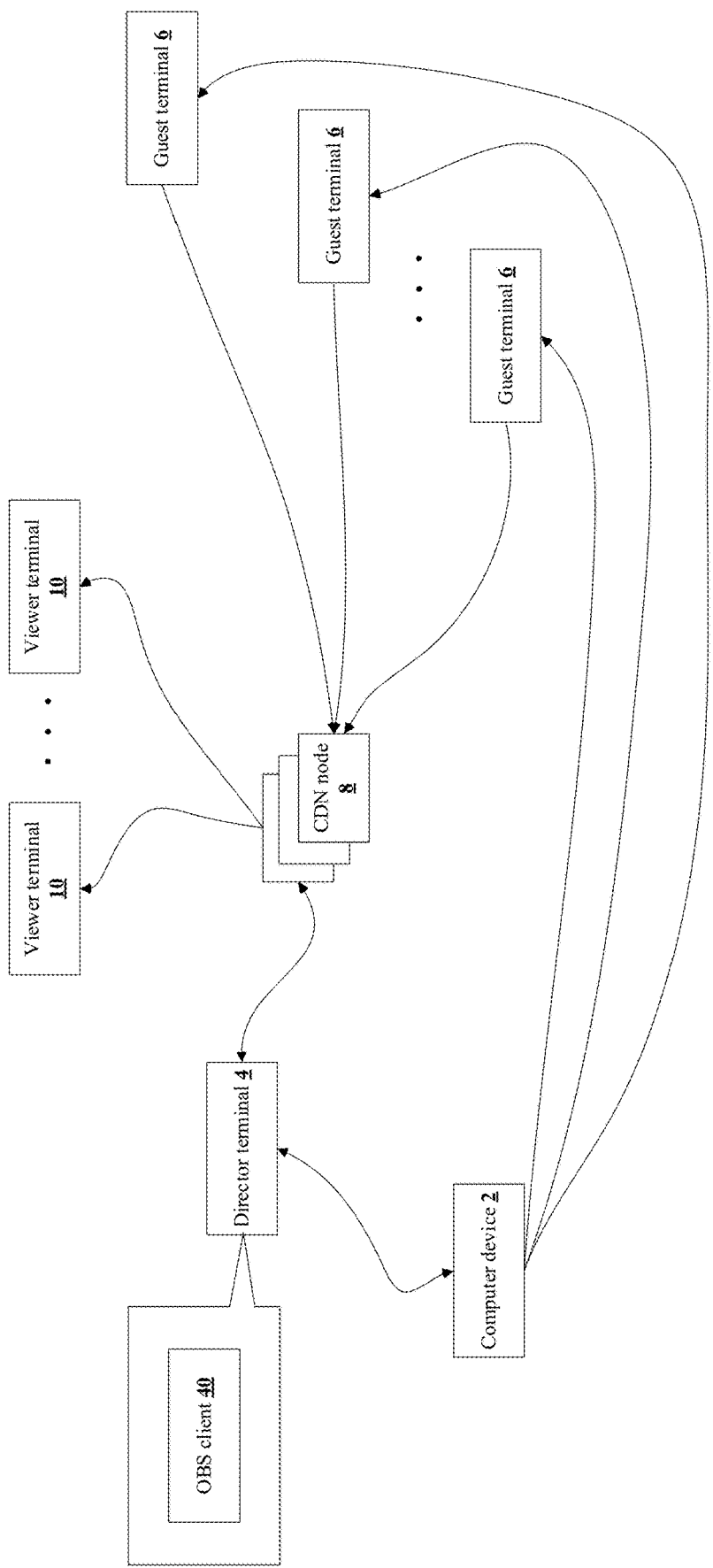
FIG. 1 is a diagram schematically showing an application environment of a directing method according to an embodiment of the present application.

The advantages of embodiments of the present application are further described below with reference to the accompanying drawings and specific embodiments.

Exemplary embodiments are illustrated in detail here, and examples thereof are shown in the accompanying drawings. When the following description refers to the figures, the same numerals in different figures represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms used in the present disclosure are merely for the purpose of describing specific embodiments, and are not intended to limit the present disclosure. The terms "a/an", "said" and "the" in the singular form used in the present disclosure and the appended claims are also intended to include the plural form unless otherwise clearly indicated in the context. It should also be understood that the term "and/or" used herein indicates and includes any or all possible combinations of at least one associated listed item.

It should be understood that although the terms, such as first, second, and third, may be used in the present disclosure to describe various types of information, such information should not be limited to these terms. The terms are merely used to distinguish the same type of information from each other. For example, without departing from the scope of the present disclosure, first information may alternatively be referred to as second information, and similarly, second information may alternatively be referred to as first information. Depending on the context, the word "if" as used herein may be interpreted as "when" or "upon" or "in response to the determination".

In the descriptions of the embodiments of the present application, it should be understood that, the reference numerals of steps do not indicate the order of execution of the steps, but are merely to facilitate the description of the embodiments of the present application and distinguishing between the steps, and thus will not be interpreted as limiting the embodiments of the present application.

FIG. 1 is a diagram of an implementation environment of a directing method according to an embodiment of the present application. A computer device 2, a director terminal 4, a guest terminal 6, a CDN node 8, and a viewer terminal 10 may be included in the implementation environment diagram. Wherein:

the computer device 2 is used as a back-end server configured to provide a live streaming service, for example, configuring directing information.

The director terminal 4 is also referred to as an operations terminal that may be configured to be connected to the computer device 2. An operating system such as Microsoft Windows, Linux, Mac OS, Android, or IOS may be run on the director terminal 4, and an open broadcaster software (OBS) client 40 is installed in the above operating system. A director may use the director terminal 4 to send a request to the computer device 2 to access a control table page and its child page for studio management, and configure various types of data such as a guest, a push stream, a pull stream or the like on the control table page.

Figure 2:
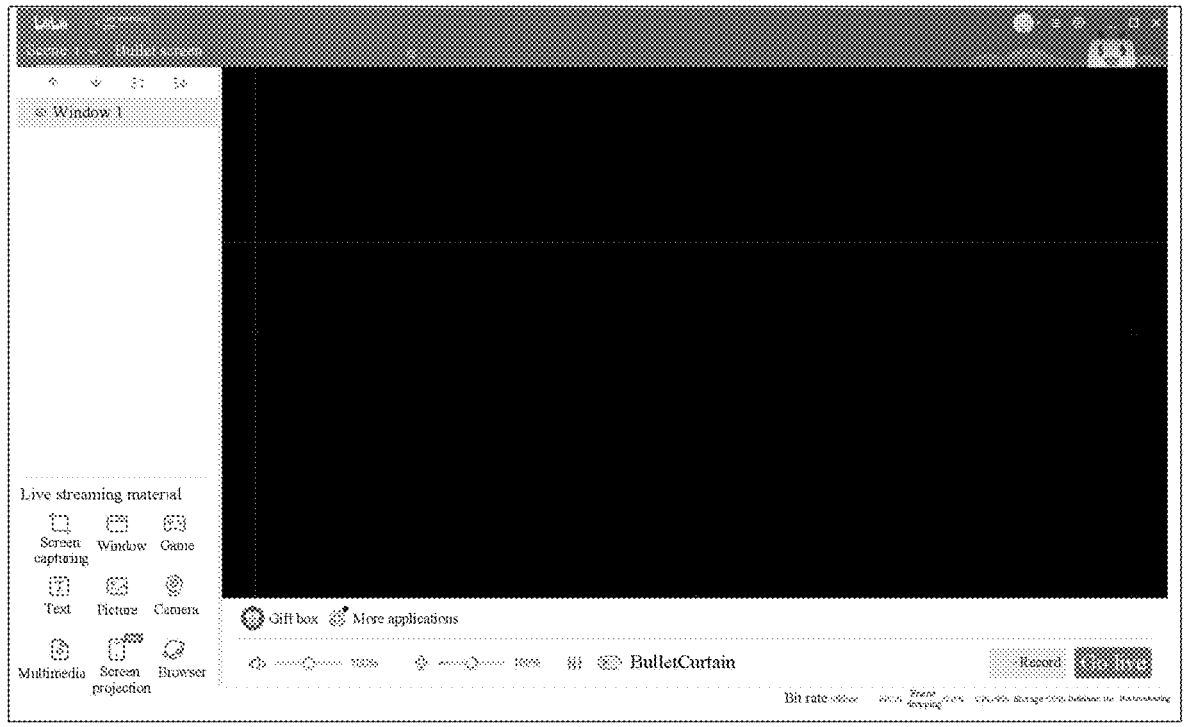
FIG. 2 is a schematic diagram of an optional interface for a guest terminal.
Figure 3:
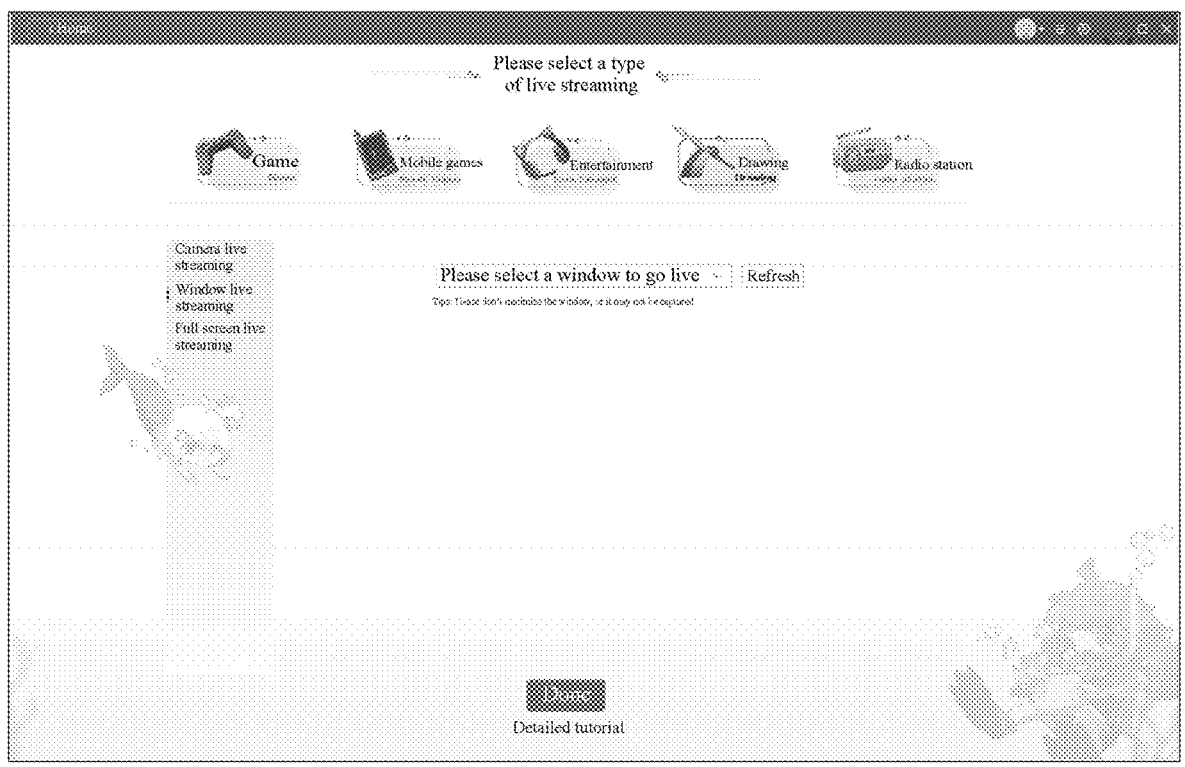
FIG. 3 is a schematic diagram of an optional interface for a guest terminal.
Figure 4:
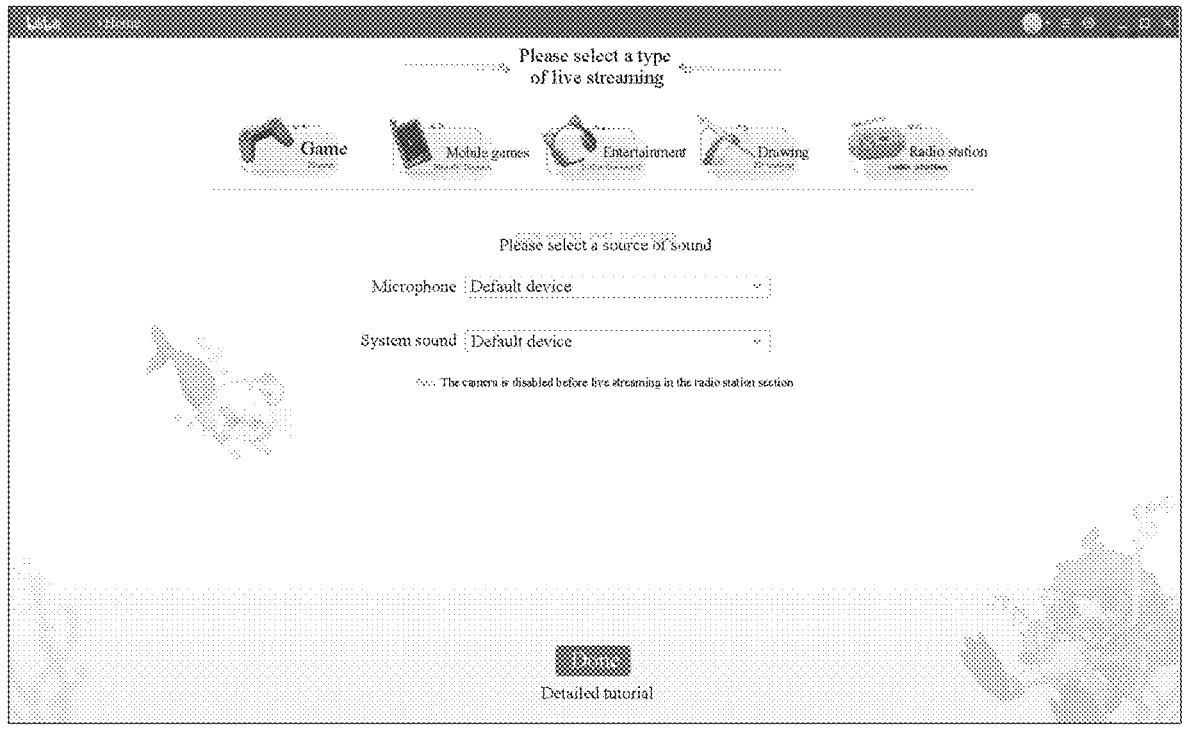
FIG. 4 is a schematic diagram of an optional interface for a guest terminal.

The guest terminal 6 may be configured to be connected to the computer device 2, and a live streaming application or another application having a live streaming function is installed in the guest terminal 6. As shown in FIG. 2 to FIG. 4, the live streaming application is used to: acquire live streaming content on the guest terminal 6, for example, by invoking a camera to acquire a video, by using internal screen recording software to acquire a window of a display interface, by invoking a microphone or topic to acquire audio, or by invoking a game file; then add a picture, animation, a special effect, multimedia, or the like to generate live streaming content; and convert live streaming content materials into data in a streaming media format, and push the data by using a corresponding streaming media transport protocol.

The content delivery network (CDN) node 8 is configured to receive the data in the streaming media format pushed by the guest terminal 6; and may be further configured to be connected to the director terminal 4, where the OBS client 40 in the director terminal 4 and the CDN node 8 are decoupled, a push stream address and a pull stream address of the OBS client 40 correspond to the CDN node 8, and the OBS client 40 may push a stream to the CDN node 8, or may pull a stream from the CDN node 8. The OBS client 40 is video recording and video real-time streaming software having a plurality of functions and is widely used in the field of video acquiring, live streaming, or the like.

The viewer terminal 10 is configured to pull a stream from the CDN node 8, that is, receive the data in the streaming media format forwarded by the CDN node 8. A live streaming application or another application having a live streaming function is installed in the viewer terminal 10, to present live streaming content. The viewer terminal 10 may be a desktop computer, a smart phone, a tablet computer, a laptop computer, other display terminals, or the like. The live streaming content includes, but is not limited to, a video, audio, a picture, animation, a special effect, a text, etc.

Embodiment 1

Figure 5:
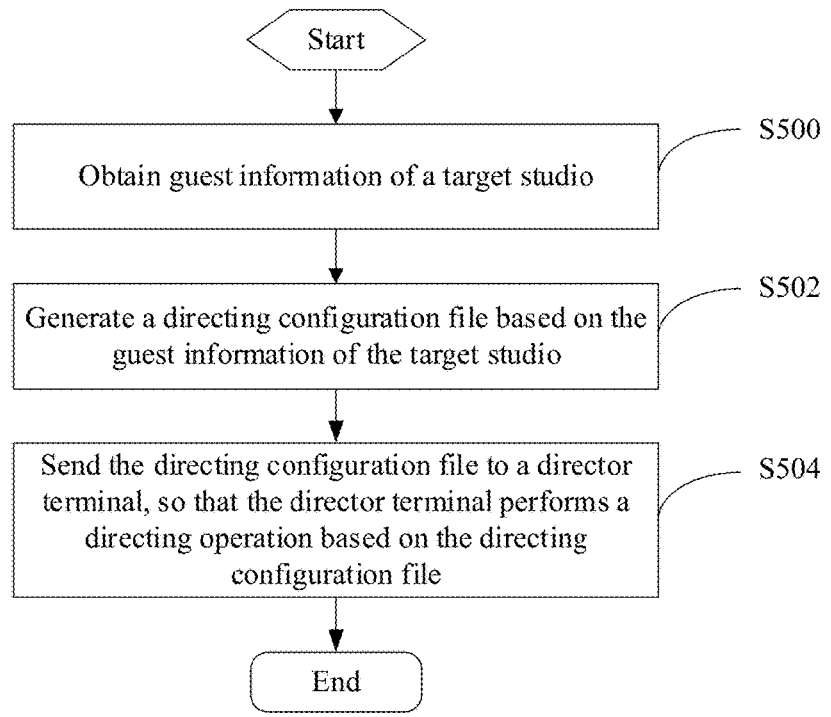
FIG. 5 is a flowchart schematically showing a directing method according to Embodiment 1 of the present application.

FIG. 5 is a flowchart of steps of a directing method according to Embodiment 1 of the present application. It may be understood that this method embodiment may be executed in a computer device 2, and the flowchart of this method embodiment is not used to limit the order of execution of the steps.

As shown in FIG. 5, the directing method may include steps S500 to S504, wherein:

In step S500, guest information of a target studio is obtained, where the guest information includes a room identification number of a guest room.

In step S502, a directing configuration file is generated based on the guest information of the target studio.

In step S504, the directing configuration file is sent to a director terminal to facilitate directing operation by the director terminal based on the directing configuration file.

It should be noted that the target studio is a webcast studio or an online studio.

During live streaming, for implementing a function of directing switching and transitions, in an existing solution, a set of costly facilities which cost tens of thousands to hundreds of thousands are required to implement signal switching, sound adjustment, caption adding, program broadcasting, signal recording, virtual set, streaming media recording and live streaming broadcasting, etc. In addition, two to three or more people are needed for cooperative work, leading to high labor costs.

To remove dependence on such a physical facility, and reduce facility costs and labor costs, in the embodiments of the present application, a file is configured on the computer device 2 by using the director terminal 8. For example, corresponding guest information is input, so that the computer device 2 can generate the directing configuration file of the target studio by using one key. An operation procedure thereof is simple and has high directing efficiency, and does not require cooperative work involving a plurality of people, thereby effectively implementing a function of directing transitions and switching with low costs and simply using software.

Figure 6:
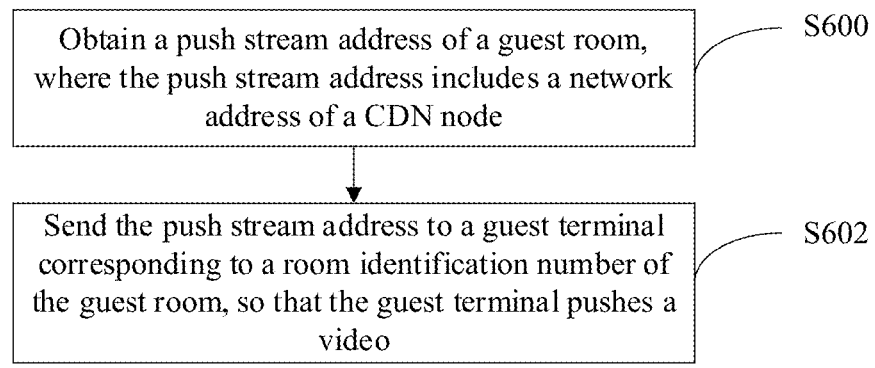
FIG. 6 is a newly added flowchart schematically showing a directing method according to Embodiment 1 of the present application.

Further, as shown in FIG. 6, the directing method may include steps S600 and S602. In step S600, a push stream address of the guest room is obtained, where the push stream address includes a network address of a CDN node. In step S602, the push stream address is sent to a guest terminal 4 corresponding to the room identification number of the guest room, to facilitate that the guest terminal 4 pushes a video stream into the CDN node.

Unlike other directing software such as MSshow which only supports configuration of a pull stream address, this embodiment of the present application further configures or generates a push stream address (that is, a network address of the CDN node). A video stream of a guest terminal 6 may be forwarded through the specific push stream address (such as an RTMP push stream address) by a pre-specified CDN node, thereby preventing leakage of live streaming content of a guest.

To facilitate understanding, examples of details of generating and using the directing configuration file are provided, which are specifically as follows:

(1) A director uses the director terminal 4 to access a control table page of the computer device 2 for studio management, and performs an operation such as writing, deletion, selection, etc. on the control table page.

(2) The computer device 2 determines the target studio, the guest information of the target studio, and the push stream address based on the operation performed by the director on the control table page, to generate the directing configuration file corresponding to the target studio.

The guest information of the target studio includes a guest identifier of a guest, an identification number of a guest room, etc.

The push stream address may be written by the director by using the control table page, or may be automatically generated by the computer device 2.

(3) The computer device 2 provides the directing configuration file for the live streamer terminal 4, and sends the push stream address to the guest terminal 6.

When a live streaming service is started on the guest terminal 6, the computer device 2 may send the push stream address to the guest terminal 6. After the guest terminal 6 receives the push stream address, the video stream may be pushed to the CDN node 8 corresponding to the push stream address.

(4) After receiving the directing configuration file, the live streamer terminal 4 imports the directing configuration file into an OBS client.

(5) The live streamer terminal 4 may perform a directing operation based on the directing configuration file. For example: the directing operation may be performed based on the directing configuration file and a preset directing procedure, or the directing operation may be performed based on the directing configuration file and a user instruction.

Figure 7:
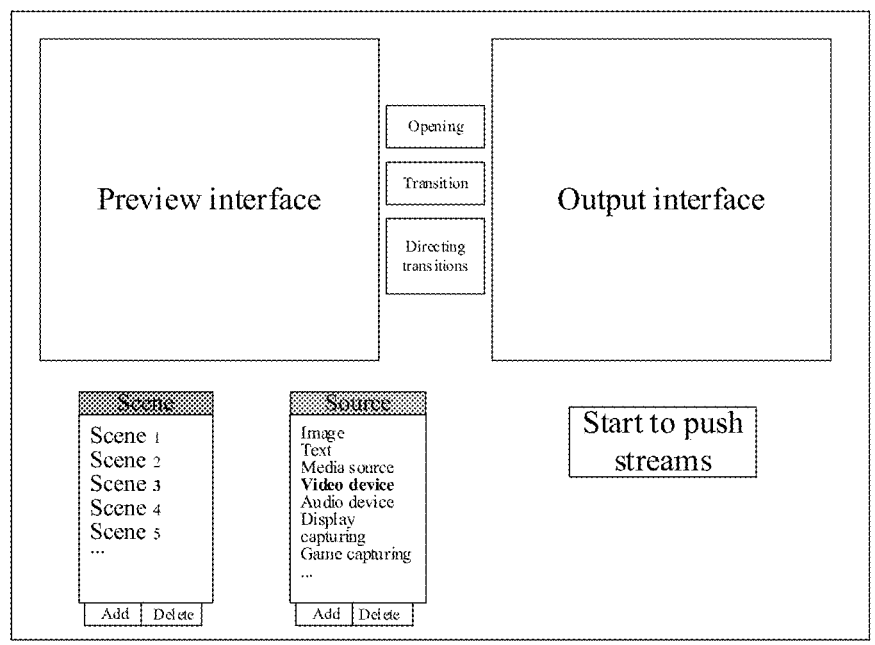
FIG. 7 is a schematic diagram of an optional directing interface for a director terminal.

For example, as shown in FIG. 7, the directing configuration file includes: a scene 1 of a guest room A, a scene 2 of a guest room B, a scene 3 of a guest room C, a scene 4 of a guest room D, etc. The live streamer terminal 4 may switch, based on a user instruction, scene content of the target studio from live streamed pictures of the scene 1 and the scene 2 to live streamed pictures of the scene 3, so that live streamed pictures provided in the guest room C can be pushed to a viewer terminal 10.

Embodiment 2

Figure 8:
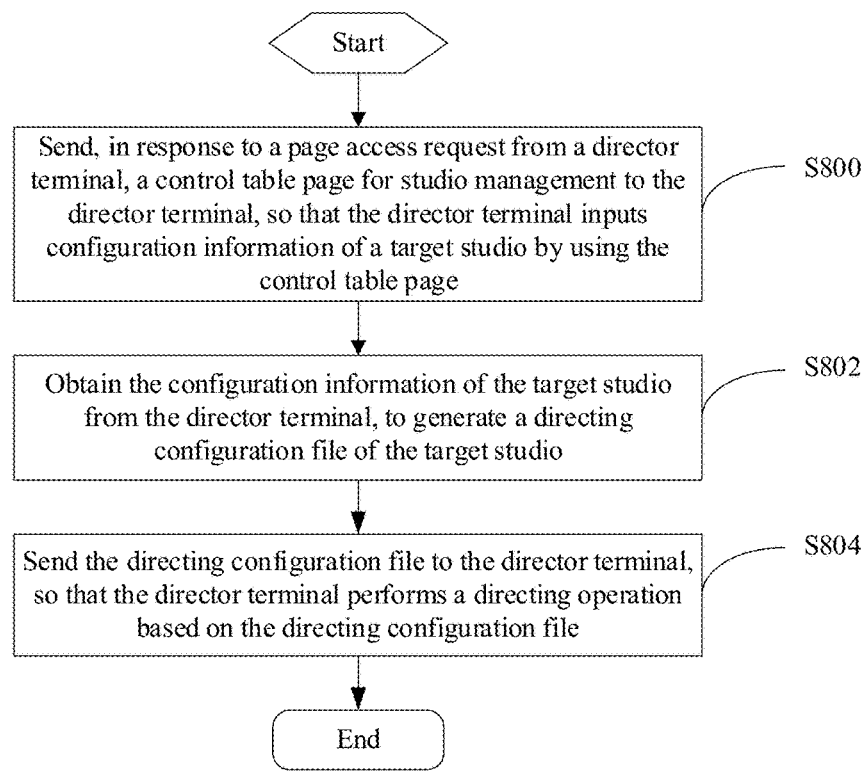
FIG. 8 is a flowchart schematically showing a directing method according to Embodiment 2 of the present application.

FIG. 8 is a flowchart of steps of a directing method according to Embodiment 2 of the present application. The directing method may include steps S800 to S806, wherein:

In step S800, a computer device 2 sends, in response to a page access request from the director terminal, a control table page for studio management to the director terminal 4, to facilitate inputting configuration information of the target studio by the director terminal 4 using the control table page.

The director terminal 4 initiates an access request to the computer device 2, and the computer device 2 generates and returns the control table page to the director terminal 4 in response to the access request. In some other embodiments, the control table page may be a child page preset in the director terminal 4.

Figure 9:
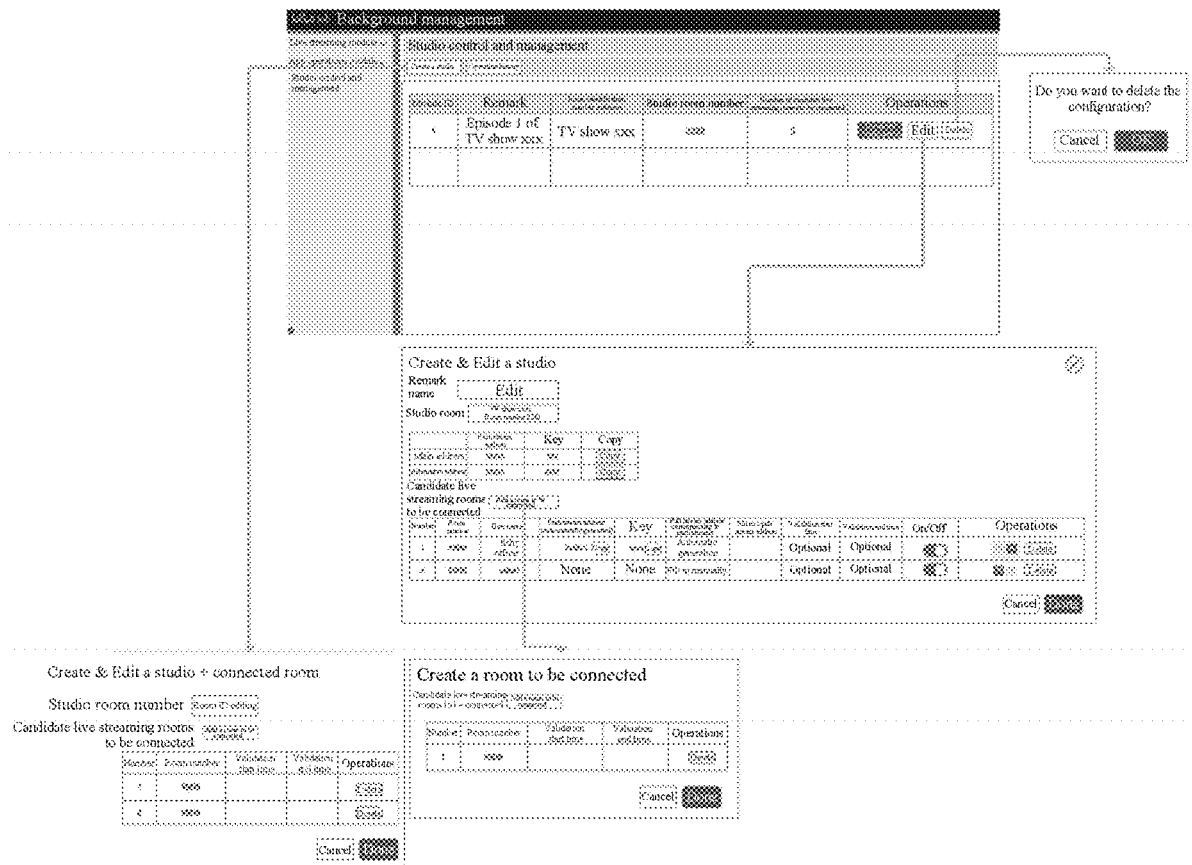
FIG. 9 is a schematic diagram of an optional control table page and its child pages.

As shown in FIG. 9, the control table page includes a studio list corresponding to each studio, and the studio list includes studio description information, a downloading widget, and/or an editing widget. The studio description information includes a room identification number and name, a remark, etc. in a corresponding studio. The downloading widget is configured to control whether to push a preconfigured directing configuration file. The deletion widget is configured to control whether to delete a corresponding studio list. The editing widget is configured to control pushing of an editing page of the corresponding studio.

In an exemplary embodiment, the control table page includes a target studio list of the target studio, and then a downloading widget in the target studio list is configured to trigger pushing of the directing configuration file of the target studio to the director terminal 4. If the live streamer terminal 4 needs to download the directing configuration file of the target studio, the director may trigger the downloading widget in the target studio list on the live streamer terminal 4, to enable the live streamer terminal 4 to send a request to the computer device 2 to download the directing configuration file. After receiving the request to download the directing configuration file, the computer device 2 pushes the directing configuration file to the live streamer terminal 4. Certainly, the computer device 2 may alternatively push the directing configuration file to the live streamer terminal 4 at a predetermined frequency.

In an exemplary embodiment, the control table page includes a target studio list of the target studio, and then an editing widget in the target studio list is configured to trigger pushing of an editing page for editing the target studio to the director terminal 4. If the live streamer terminal 4 needs to edit the directing configuration file of the target studio, the director may trigger the editing widget in the target studio list on the live streamer terminal 4, to enable the live streamer terminal 4 to send a request to the computer device 2 for the editing page for editing the target studio. After receiving the request for the editing page for editing the target studio, the computer device 2 generates the editing page for editing the target studio, and returns the editing page for editing the target studio to the live streamer terminal 4 for the director to use for editing.

The editing page for the target studio includes a plurality of room lists corresponding to a plurality of candidate rooms, and each room list includes description information of a corresponding candidate room, a switch widget, and/or a reorder widget. The description information of the candidate room includes a room identification number, a guest name, a validation start time, and a validation end time of the candidate room. The switch widget is configured to control whether to configure the corresponding candidate room as a guest room of the target studio. The reorder widget is configured to adjust an order of positions of candidate rooms.

In an exemplary embodiment, the editing page for the target studio further includes a room adding widget, wherein the room adding widget is configured to trigger pushing of an editing page for creating a candidate room to the director terminal 4. If the live streamer terminal 4 needs to add a candidate room to the editing page for the target studio, the director may trigger the room adding widget on the editing page for the target studio, to enable the live streamer terminal 4 to send a request to the computer device 2 for the editing page for creating a candidate room. After receiving the request for the editing page for creating a candidate room, the computer device 2 generates the editing page for creating a candidate room, and returns the editing page for creating a candidate room to the live streamer terminal 4, so that the director inputs configuration information of a newly created candidate room, for example, a room identification number, a validation start time, a validation end time, etc.

In an exemplary embodiment, there may not be a target studio list corresponding to the target studio on the control table page, and the control table page includes a studio creating widget. The studio creating widget is configured to trigger pushing of an editing page for creating the target studio to the director terminal 4. If the live streamer terminal 4 needs to add a target studio list to the control page, the director may trigger the studio creating widget on the control table page on the live streamer terminal 4, to enable the live streamer terminal 4 to send a request to the computer device 2 for the editing page for creating a studio. After receiving the request for the editing page for creating a studio, the computer device 2 generates the editing page for creating a studio, and returns the editing page for creating a studio to the live streamer terminal 4, so that the director inputs configuration information of a newly created studio, for example, a room identification number in a studio, a candidate room identification number of a candidate room used for connection, a validation start time, a validation end time, etc.

In step S802, the computer device 2 obtains the configuration information of the target studio from the director terminal 4, to generate the directing configuration file of the target studio. The directing configuration file includes guest information of the target studio and a push stream address. The guest information is used to indicate a guest room connected to the target studio, and the guest information is edited or pre-edited by the director on the control page and its child page on the director terminal 4. The push stream address is edited by the director on the control page and its child page on the director terminal, or may be automatically allocated by the computer device 2 for the target studio. In an exemplary embodiment, the push stream address may be obtained by the following steps: obtaining a service status of each CDN node in a CDN network; and configuring a network address corresponding to a CDN node with the best service status as a push stream address of each candidate room. Compared with a bound CDN node, automatic allocation in this embodiment is with higher flexibility.

In step S804, the computer device 2 sends the directing configuration file to the director terminal 4 to facilitate directing operation by the director terminal 4 based on the directing configuration file. The director terminal 4 loads the directing configuration file to an OBS client. In an OBS client 40, each guest room corresponds to a scene. The OBS client 40 may switch a scene of the target studio under control of the director, to control output pictures pushed to various viewer terminals 10.

In this embodiment of the present application, data exchange between the director terminal 4 and the computer device 2 may be implemented by using the control page. For example, configuration may be performed for the target studio through editing and control operations on the control page and its child page, so that the computer device 2 generates the directing configuration file based on information on the control page and its child page by using one key. The director terminal 4 obtains the directing configuration file from the computer device 2, and loads the directing configuration file to the OBS client 40. The OBS client 40 configures various types of data, such as a corresponding scene of each guest room, based on the directing configuration file. The director may switch a scene of the target studio by using the OBS client 40 to which the directing configuration file is loaded, to control output pictures pushed to various viewer terminals 10. It can be learned from above descriptions that in the directing method described in this embodiment, an operation procedure thereof is simple and has high directing efficiency, and does not require cooperative work involving a plurality of people, thereby effectively implementing a function of directing transitions and switching with low costs and simply using software. Directing costs thereof are low, and a directing operation can be performed by using only one director terminal (such as a notebook computer) with a built-in OBS client.

In addition, this embodiment is highly extensible. In theory, guest information of an infinite number of guests may be configured for the target studio by using the control page, and output pictures of guest rooms of the infinite number of guests can be sequentially used as output pictures of the target studio.

Figure 10:
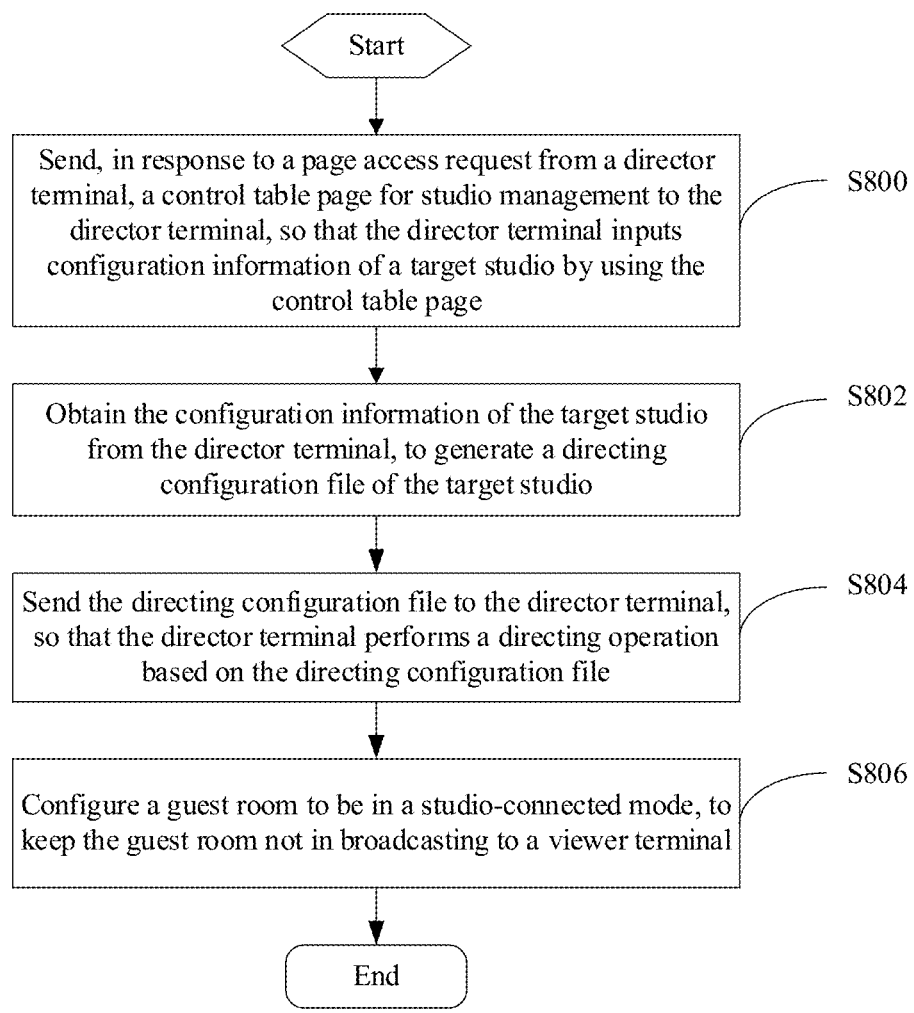
FIG. 10 is another flowchart schematically showing a directing method according to Embodiment 2 of the present application.

As shown in FIG. 10, in an exemplary embodiment, the directing method may further include step S806: configuring the guest room to be in a studio-connected mode, to keep the guest room not in broadcasting to a viewer terminal 10. That is, output pictures of the guest room can be output only via the target studio. The viewer terminal 4 needs to access the target studio to obtain output pictures of each guest room, but cannot directly access the guest room and obtain output pictures of the guest room. It can be easily understood that the studio-connected mode can prevent leakage of live streaming content of a guest.

To facilitate understanding, examples of a process of directing configuration and using are provided, which are specifically as follows:

(1) The computer device 2 obtains the guest information of the target studio and a push stream address of each guest room based on the operation performed by the director on the control table page, to generate the directing configuration file corresponding to the target studio.

The directing configuration file may include a push stream configuration file and a guest configuration file.

The guest information of the target studio includes a guest identifier of a guest, an identification number of a guest room, etc. The push stream address may be written by the director by using the control table page, or may be automatically generated by the computer device 2.

(2) The computer device 2 provides the directing configuration file for the live streamer terminal 4, and sends the push stream configuration file to the guest terminal 6.

When a live streaming service is started on the guest terminal 6, the computer device 2 may send the push stream configuration file to the guest terminal 6. After the guest terminal 6 receives the push stream configuration file, the video stream may be pushed to the CDN node 8 corresponding to the push stream address.

(3) The live streamer terminal 4 obtains the directing configuration file from the computer device 2, and imports the received directing configuration file into the OBS client.

(4) The OBS client may generate a scene set based on a guest information file, where the scene set includes a scene identifier corresponding to each guest room; and configure a push stream address and a pull stream address of the OBS based on the push stream configuration file.

Directing operation 1: The OBS client obtains one or more corresponding video streams from the CDN node 8 based on scenes for selection (corresponding scene identifiers of guest rooms), performs processing such as synthesizing and transcoding on the video streams, and pushes processed video streams to the CDN node 8. The CDN node 8 then pushes the processed video streams to the viewer terminal 10.

Directing operation 2: The OBS client remotely controls the CDN node 8 to obtain one or more corresponding video streams from one or more guest terminals 6 based on scenes for selection (corresponding scene identifiers of guest rooms), so that the CDN node 8 receives and processes the video streams, and then pushes processed video streams to the viewer terminal 10.

The OBS client may further configure local content of the director terminal 4 to use the local content as content for opening or content for transition.

Embodiment 3

Figure 11:
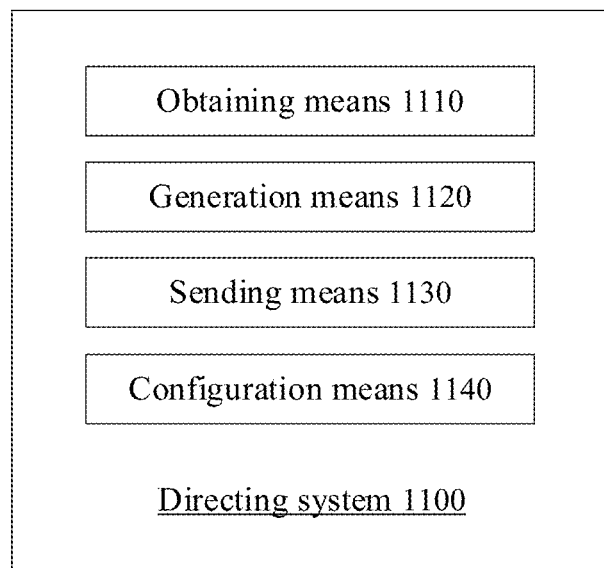
FIG. 11 is a block diagram schematically showing a directing system according to Embodiment 3 of the present application.

FIG. 11 is a block diagram schematically showing a directing system according to Embodiment 3 of the present application. The directing system may be divided into one or more program means, and the one or more program means are stored in a storage medium and executed by one or more processors to implement the embodiments of the present application. The program means referred to in the embodiments of the present application refer to a series of computer-readable instruction segments that can complete a specific function. The functions of various program means in this embodiment will be specifically described in the following description.

As shown in FIG. 11, the directing system 1100 may include an obtaining means 1110, a generation means 1120, a sending means 1130, and a configuration means 1140.

The obtaining means 1110 is configured to obtain guest information of a target studio, where the guest information includes a room identification number of a guest room.

The generation means 1120 is configured to generate a directing configuration file based on the guest information of the target studio.

The sending means 1130 is configured to send the directing configuration file to a director terminal, so that the director terminal performs a directing operation based on the directing configuration file.

In an exemplary embodiment, the obtaining means 1110 is further configured to: obtain a push stream address of the guest room, where the push stream address includes a network address of a CDN node. The sending means 1130 is further configured to: send the push stream address to a guest terminal corresponding to the room identification number of the guest room, so that the guest terminal pushes a video stream into the CDN node.

In an exemplary embodiment, the sending means 1130 is further configured to: send, in response to a page access request from the director terminal, a control table page for studio management to the director terminal, so that the director terminal inputs configuration information of the target studio by using the control table page, where the configuration information includes the guest information, where the control table page includes a studio list corresponding to each studio, and the studio list includes studio description information, a downloading widget, and/or an editing widget.

In an exemplary embodiment, if the control table page includes a target studio list of the target studio: a downloading widget in the target studio list is configured to trigger pushing of the directing configuration file of the target studio to the director terminal.

In an exemplary embodiment, if the control table page includes a target studio list of the target studio: an editing widget in the target studio list is configured to trigger pushing of an editing page for editing the target studio to the director terminal, where the editing page for the target studio includes a plurality of room lists corresponding to a plurality of candidate rooms, and each room list includes description information of a corresponding candidate room, a switch widget, and/or a reorder widget; and where the switch widget is configured to control whether to configure the corresponding candidate room as a guest room of the target studio.

In an exemplary embodiment, each room list further includes a push stream address of the corresponding candidate room, and the push stream address is obtained in the following manner: obtaining a service status of each CDN node in a CDN network; and configuring a network address corresponding to a CDN node with the best service status as a push stream address of each candidate room.

In an exemplary embodiment, the editing page for the target studio further includes a room adding widget, where the room adding widget is configured to trigger pushing of an editing page for creating a candidate room to the director terminal.

In an exemplary embodiment, the control table page includes a studio creating widget, where the studio creating widget is configured to trigger pushing of an editing page for creating the target studio to the director terminal.

In an exemplary embodiment, the configuration means 1140 is further included and is configured to: configure the guest room to be in a studio-connected mode, to keep the guest room not in broadcasting to a viewer terminal 10.

Embodiment 4

Figure 12:
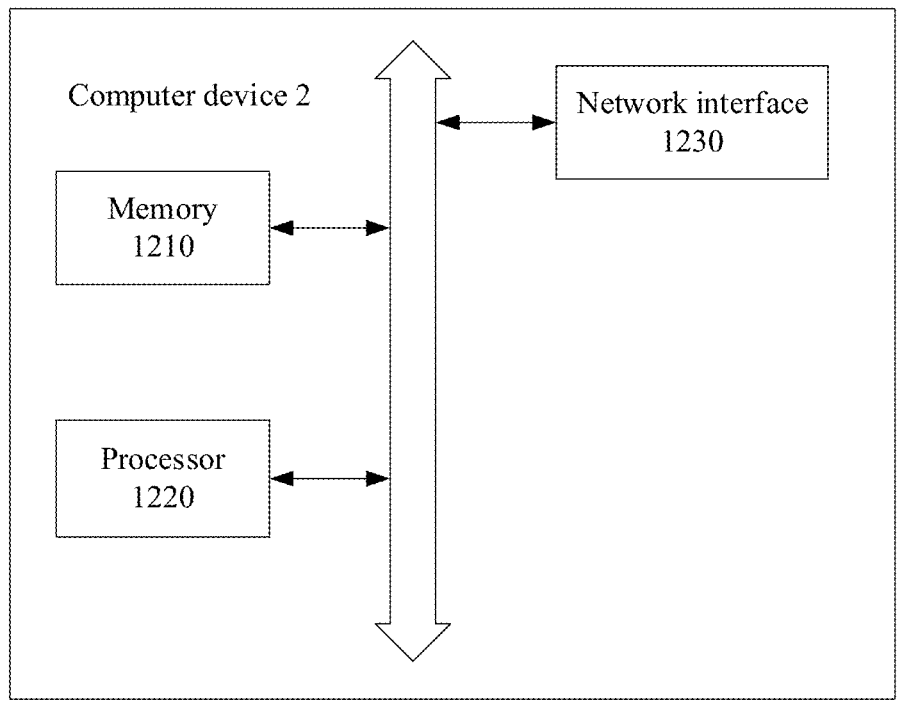
FIG. 12 is a schematic diagram schematically showing a hardware architecture of a computer device suitable for implementing a directing method according to Embodiment 4 of the present application.

FIG. 12 is a schematic diagram schematically showing a hardware architecture of a computer device suitable for implementing a directing method according to Embodiment 4 of the present application. In this embodiment, a computer device 2 is a device that may automatically perform numerical calculation and/or information processing according to preset or pre-stored instructions. For example, the computer device may be a rack server, a blade server, a tower server, or a cabinet server (including an independent server or a server cluster composed of a plurality of servers), etc. As shown in FIG. 12, the computer device 2 at least includes, but is not limited to: a memory 1210, a processor 1220, and a network interface 1230 that can be communicatively connected to each other via a system bus. Wherein:

the memory 1210 includes at least one type of computer-readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 1210 may be an internal storage means of the computer device 2, for example, a hard disk or a memory of the computer device 2. In some other embodiments, the memory 1210 may alternatively be an external storage device of the computer device 2, for example, a plug-in hard disk disposed on the computer device 2, a smart media card (SMC for short), a secure digital (SD for short) card, and a flash card. Certainly, the memory 1210 may alternatively include both the internal storage means of the computer device 2 and the external storage device thereof. In this embodiment, the memory 1210 is generally configured to store an operating system and various application software installed in the computer device 2, such as program codes for the video playing method. In addition, the memory 1210 may be configured to temporarily store various types of data that has been output or will be output.

The processor 1220 may be, in some embodiments, a central processing unit (CPU for short), a controller, a microcontroller, a microprocessor, or other data processing chips. The processor 1220 is generally configured to control overall operation of the computer device 2, for example, executing control, processing, etc. related to data exchange or communication with the computer device 2. In this embodiment, the processor 1220 is configured to run program codes stored in the memory 1210 or process data.

The network interface 1230 may include a wireless network interface or a wired network interface, and the network interface 1230 is generally configured to establish a communication connection between the computer device 2 and other computer devices. For example, the network interface 1230 is configured to connect the computer device 2 to an external terminal through a network, and establish a data transmission channel, a communication link, etc. between the computer device 2 and the external terminal. The network may be a wireless or wired network such as Intranet, Internet, Global System of Mobile Communications (GSM for short), wideband code division multiple access (WCDMA for short), a 4G network, a 5G network, Bluetooth, or Wi-Fi, etc.

It should be noted that FIG. 12 shows only a computer device having components 1210 to 1230, but it should be understood that not all of the illustrated components are required to be implemented, and more or fewer components may be implemented instead.

In this embodiment, the video playing method stored in the memory 1210 may also be divided into one or more program means and executed by one or more processors (by the processor 1220 in this embodiment) to implement the present application.

Embodiment 5

This embodiment further provides a computer-readable storage medium having stored thereon computer-readable instructions, where when the computer-readable instructions are executed by a processor, the following steps are implemented:
  obtaining guest information of a target studio, where the guest information includes a room identification number of a guest room;
  generating a directing configuration file based on the guest information of the target studio; and
  sending the directing configuration file to a director terminal, so that the director terminal performs a directing operation based on the directing configuration file.

In this embodiment, the computer-readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device. In some other embodiments, the computer-readable storage medium may alternatively be an external storage device of the computer device, for example, a plug-in hard disk disposed on the computer device, a smart media card (SMC for short), a secure digital (SD for short) card, and a flash card, etc. Certainly, the computer-readable storage medium may alternatively include both the internal storage unit of the computer device and the external storage device thereof. In this embodiment, the computer-readable storage medium is generally configured to store an operating system and various application software installed in the computer device, such as program codes for the video playing method in the embodiments. In addition, the computer-readable storage medium may be configured to temporarily store various types of data that has been output or will be output.

Embodiment 6

Figure 13:
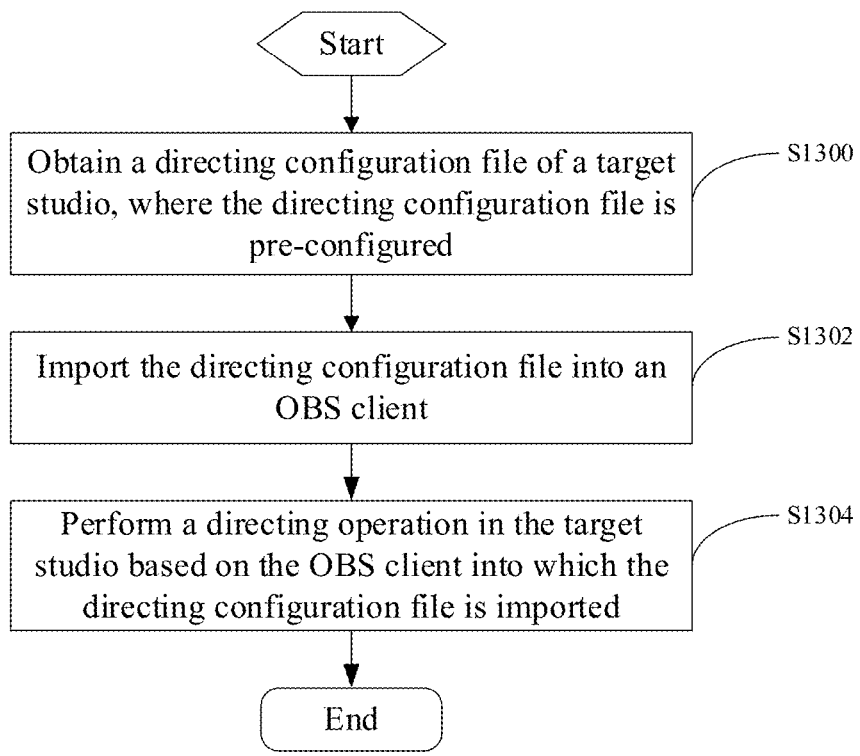
FIG. 13 is a flowchart schematically showing a directing method according to Embodiment 6 of the present application.
Figure 14:
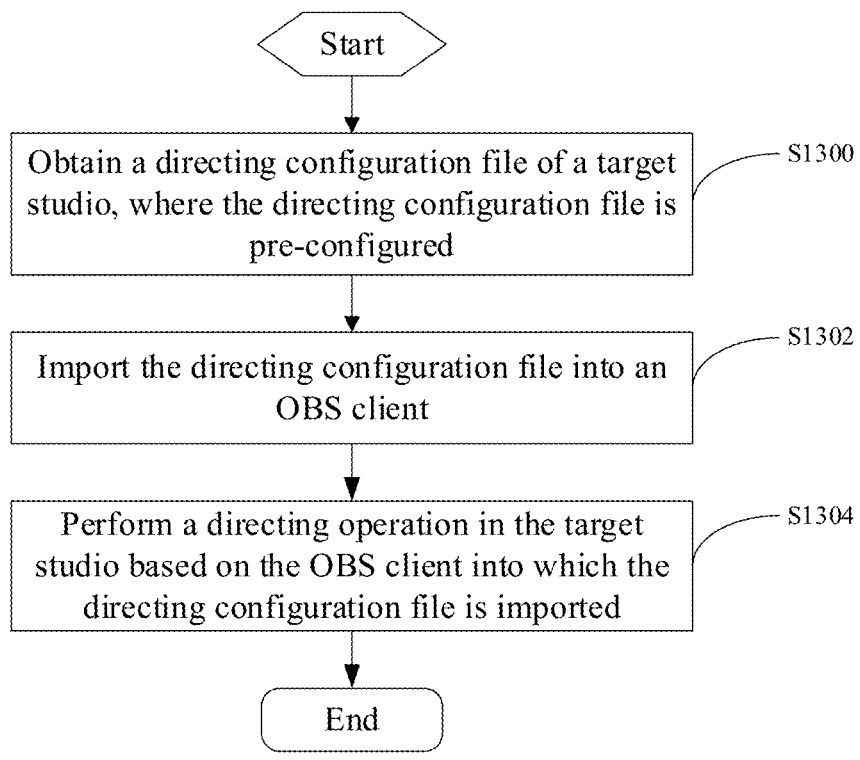
FIG. 14 is a specific flowchart of step S1300 in FIG. 13.

FIG. 13 is a flowchart schematically showing a video playing method according to Embodiment 6 of the present application. It can be understood that this method embodiment may be executed in the director terminal 6, and the flowchart in this method embodiment is not used to limit the order of execution of steps.

Step S1300: a directing configuration file of a target studio is obtained, where the directing configuration file is pre-configured;

Step S1302: the directing configuration file is imported into an OBS client.

Step S1304: a directing operation is performed in the target studio based on the OBS client into which the directing configuration file is imported.

The server may be the computer device 2 in FIG. 1, and is configured to provide a live streaming service, for example, generation of the directing configuration file and generation and delivery of a push stream address.

In the embodiments of the present application, the director terminal 8 accesses the server and inputs configuration information, so that the server generates the directing configuration file of the target studio; or a directing configuration file pre-configured in the server may be downloaded by using one key, and the directing configuration file is loaded to the OBS client. A directing operation such as scene switching can be performed by using the OBS client to which the directing configuration file is loaded. An operation procedure thereof is simple and has high directing efficiency, and does not require cooperative work involving a plurality of people because a directing operation can be performed by a single person using one director terminal 6, thereby effectively implementing a function of directing transitions and switching with low costs and simply using software.

In an exemplary embodiment, step S1300 may include steps S1400 to S1406. In step S1400, a control table page for studio management is obtained from a server. In step S1402, configuration information of the target studio is input based on the control table page, where the configuration information includes guest information. In step S1404, the configuration information is sent to the server, so that the server generates the directing configuration file based on the configuration information. In step S1406, the directing configuration file is obtained from the server. An exemplary procedure of generating and obtaining the directing configuration file is described above. It should be understood that the exemplary procedure is not used to limit the embodiments.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

The serial numbers of the embodiments of the present application described above are merely for description, and do not indicate that the embodiments are good or bad.

Through the descriptions of the above implementations, those skilled in the art can clearly understand that the methods in the above embodiments can be implemented by software and necessary general hardware platforms. Certainly, the implementations can also be implemented by hardware. However, in many cases, the former implementation is preferred.

The foregoing descriptions are merely illustrative of preferred embodiments of the embodiments of the present application, and are not intended to limit the patent scope of the embodiments of the present application. Any equivalent structure or equivalent process transformation made using the contents of the description and accompanying drawings of the embodiments of the present application, or any direct or indirect application thereof in other related technical fields shall equally fall within the patent protection scope of the embodiments of the present application.

What is claimed is:

1. A method of facilitating directing operations, comprising:
obtaining guest information of a target studio among a plurality of studios, wherein the guest information comprises a room identification number of a guest room, the guest room among a plurality of guest rooms associated with producing content scenes;
generating a directing configuration file based on the guest information of the target studio;
sending the directing configuration file to a director terminal associated with content directing to facilitate directing operations through the director terminal based on the directing configuration file;
determining a push stream address based on a control table page of studio management, wherein the push stream address comprises a network address of a content delivery network (CDN) node; and
sending the push stream address to a guest terminal corresponding to the room identification number of the guest room to facilitate pushing a video stream into the CDN node by the guest terminal.

2. The method of claim 1, further comprising:
sending, in response to a page access request from the director terminal, the control table page of studio management to the director terminal to facilitate input of configuration information of the target studio through the director terminal via the control table page, wherein the configuration information comprises the guest information; and
wherein the control table page comprises a studio list corresponding to each studio, and the studio list comprises studio description information, a downloading widget and an editing widget.

3. The method of claim 2, wherein when the control table page comprises a target studio list corresponding to the target studio, a downloading widget in the target studio list is configured to trigger pushing the directing configuration file of the target studio to the director terminal.

4. The method of claim 2, wherein when the control table page comprises a target studio list corresponding to the target studio, an editing widget in the target studio list is configured to trigger pushing an editing page of editing the target studio to the director terminal; and
wherein the editing page of the target studio comprises a plurality of room lists corresponding to a plurality of candidate rooms, wherein each of the plurality of room lists comprises description information of a corresponding candidate room, a switch widget and a reorder widget, and wherein the switch widget is configured to control whether to configure the corresponding candidate room as a guest room of the target studio.

5. The method of claim 4, wherein each of the plurality of room lists further comprises a push stream address of the corresponding candidate room, and the push stream address is obtained by:
obtaining a service status of each CDN node in a CDN network; and
configuring a network address corresponding to a CDN node with a best service status as a push stream address of each of the plurality of candidate rooms.

6. The method of claim 4,
wherein the editing page of the target studio further comprises a room adding widget;
wherein the room adding widget is configured to trigger pushing an editing page for creating a new candidate room to the director terminal.

7. The method of claim 2,
wherein the control table page comprises a studio creating widget;
wherein the studio creating widget is configured to trigger pushing an editing page for creating a new studio to the director terminal.

8. The method of claim 1, further comprising:
configuring the guest room to be in a studio-connected mode, and to keep the guest room in a status of not broadcasting to a viewer terminal, the viewer terminal configured to pull the content for display.

9. A non-transitory computer-readable storage medium having stored thereon computer-readable instructions, wherein the computer-readable instructions, upon executed by a processor, cause implementation of the method of claim 1.

10. A computer device, comprising a memory, a processor, and computer-readable instructions stored on the memory and executable on the processor, wherein the processor, upon executing the computer-readable instructions, implements operations comprising:
obtaining guest information of a target studio among a plurality of studios, wherein the guest information comprises a room identification number of a guest room, the guest room among a plurality of guest rooms associated with producing content scenes;
generating a directing configuration file based on the guest information of the target studio;
sending the directing configuration file to a director terminal associated with content directing to facilitate directing operations through the director terminal based on the directing configuration file;
determining a push stream address based on a control table page of studio management, wherein the push stream address comprises a network address of a content delivery network (CDN) node; and
sending the push stream address to a guest terminal corresponding to the room identification number of the guest room to facilitate pushing a video stream into the CDN node by the guest terminal.

11. The computer device of claim 10, wherein the processor, upon executing the computer-readable instructions, further implements operations comprising:
sending, in response to a page access request from the director terminal, the control table page of studio management to the director terminal to facilitate input of configuration information of the target studio through the director terminal via the control table page, wherein the configuration information comprises the guest information; and
wherein the control table page comprises a studio list corresponding to each studio, and the studio list comprises studio description information, a downloading widget and an editing widget.

12. The computer device of claim 11, wherein when the control table page comprises a target studio list corresponding to the target studio, a downloading widget in the target studio list is configured to trigger pushing the directing configuration file of the target studio to the director terminal.

13. The computer device of claim 11, wherein when the control table page comprises a target studio list corresponding to the target studio, an editing widget in the target studio list is configured to trigger pushing an editing page of editing the target studio to the director terminal; and wherein the editing page of the target studio comprises a plurality of room lists corresponding to a plurality of candidate rooms, wherein each of the plurality of room lists comprises description information of a corresponding candidate room, a switch widget and a reorder widget, and wherein the switch widget is configured to control whether to configure the corresponding candidate room as a guest room of the target studio.

14. The computer device of claim 13, wherein each of the plurality of room lists further comprises a push stream address of the corresponding candidate room, and the push stream address is obtained by:
   obtaining a service status of each CDN node in a CDN network; and
   configuring a network address corresponding to a CDN node with a best service status as a push stream address of each of the plurality of candidate rooms.

15. The computer device of claim 13,
   wherein the editing page of the target studio further comprises a room adding widget; and
   wherein the room adding widget is configured to trigger pushing an editing page for creating a candidate room to the director terminal.

\* \* \* \* \*